United States Patent

Crouch et al.

[15] 3,687,907

[45] Aug. 29, 1972

[54] RECOVERY OF SOLVENT IN ARYLENE SULFIDE POLYMER PRODUCTION

[72] Inventors: Willie W. Crouch; Charles W. Moberly, both of Bartlesville, Okla.

[73] Assignee: Phillips Petroleum Company

[22] Filed: Nov. 9, 1970

[21] Appl. No.: 88,199

[52] U.S. Cl..............260/79.1, 260/79, 260/239.3 A, 260/326.5 FN, 260/551 P, 260/561 R, 260/607 A
[51] Int. Cl. ............................................C08g 23/00
[58] Field of Search..260/79, 79.1, 326.5 FN, 607 A, 260/239.3 A, 561 R, 551 P

[56] References Cited

UNITED STATES PATENTS

| 3,354,129 | 11/1967 | Edmonds, Jr. et al. ......260/79 |
| 3,532,677 | 10/1970 | Baron.......................260/79.3 |
| 3,346,567 | 10/1967 | Westerveld et al.....260/239.3 |
| 3,583,982 | 6/1971 | Capp et al. ..............260/239.3 |
| 3,446,797 | 5/1969 | Focella et al. ..........260/239.3 |

*Primary Examiner*—Donald E. Czaja
*Assistant Examiner*—M. I. Marquis
*Attorney*—Young and Quigg

[57] ABSTRACT

A polar organic solvent selected from amides, lactams, and sulfones is extracted from an aqueous solution containing alkali metal halide. In the production of arylene sulfide polymers by the reaction of a polyhalo-substituted aromatic compound with an alkali metal sulfide in a polar organic solvent, solids are removed from an aqueous mixture of the reaction effluent and polar organic solvent is recovered from the aqueous solution by extraction with a solvent. In a preferred embodiment N-methyl-2-pyrrolidone is recovered from the aqueous solution by extraction with a solvent such as dichloromethane, chloroform, and 1,1,2,2-tetrachloroethane.

5 Claims, No Drawings

RECOVERY OF SOLVENT IN ARYLENE SULFIDE POLYMER PRODUCTION

BACKGROUND OF THE INVENTION

This invention relates to processes for the production of polymers from aromatic compounds. In one of its aspects, this invention relates to processes for the production of arylene sulfide polymers. In another of its aspects, this invention relates to the separation into solid and liquid components of the reaction mixture of the reaction of polyhalo-substituted aromatic compounds with alkali metal sulfide in a polar organic solvent. In still another of its aspects, this invention relates to the extraction of polar compounds from aqueous solutions. In yet another of its aspects, this invention relates to the recovery of polar solvents from the reaction mixture of the reaction of polyhalo-substituted aromatic compounds with an alkali metal sulfide in a polar organic solvent.

In one concept of the invention it provides a method for separating the solid and liquid components of the reaction of polyhalo-substituted aromatic compounds with an alkali metal sulfide in a polar organic solvent by filtration, centrifugation, or other mechanical means. In another of its concepts this invention provides a method for recovering a polar organic solvent from an aqueous solution by extraction with specified compounds. In still another of its concepts, this invention provides a method for recovery of a polar organic solvent from the reaction mixture of the reaction of a polyhalo-substituted aromatic compound with an alkali metal sulfide in a polar organic solvent by separation of the solid and liquid portions of the reaction mixture followed by extraction of the polar solvent from the liquid.

A process for the production of arylene sulfide polymers from polyhalo-substituted cyclic compounds containing unsaturation between adjacent ring atoms, wherein the halogen atoms are attached to ring carbon atoms with an alkali metal sulfide in a polar organic compound at an elevated temperature is disclosed in U.S. Pat. No. 3,354,129. To make such a process commercially desirable suitable means must be found for recovery of the organic solvent used in the process. Various known processes and combinations of processes for recovery of a polar organic solvent from a reaction mixture can be proposed. However, the order in which a combination of steps is performed is important in yielding commercially acceptable results. Having determined the use of a combination of processes the success of which depends on definite physical or chemical characteristics of the compounds acted upon, such as the process of extraction, the choice of agents for carrying out the process, i.e., extractants, is paramount to the success of the process.

Accordingly, it is an object of this invention to provide a method for recovering the polar organic solvent from the reaction mixture of the reaction of polyhalo-substituted aromatic compounds with an alkali metal sulfide in a polar organic solvent.

It is another object of this invention to provide a method for separating the solid and liquid materials of the reaction mixture of polyhalo-substituted aromatic compounds with an alkali metal sulfide in a polar organic solvent.

It is still another object of this invention to provide a method for recovering polar organic solvent from the aqueous solution produced in removing solids from the reaction mixture in the reaction of polyhalo-substituted aromatic compounds with an alkali metal sulfide in a polar organic solvent.

Other aspects, objects and advantages of this invention will be apparent to one skilled in the art upon reading the specification and the appended claims.

SUMMARY OF THE INVENTION

In accordance with this invention, a polar organic solvent chosen from among amides, lactams and sulfones is recovered from an aqueous solution containing alkali metal halide by extraction with an extractant selected from among dichloromethane, chloroform, 1,2-dichloroethane, 1,1,2-trichloroethane, 1,1,2,2-tetrachloroethane, trichloroethylene, 1-hexanol, cyclohexanol, methyl isobutyl ketone, aniline, and mixtures thereof.

In accordance with an embodiment of this invention, in the production of arylene sulfide polymers by the reaction of polyhalo-substituted aromatic compounds with an alkali metal sulfide in a polar organic solvent, solid materials are removed from an aqueous mixture of the reaction effluent; polar organic solvent is recovered from the aqueous mixture by extraction with a selected extractant and the polar organic solvent is separated from the extractant.

The process of this invention is particularly useful in the recovery of polar organic solvent employed in the production of arylene sulfide polymers by the process of U.S. Pat. No. 3,354,129. Thus, the process of the instant invention is useful in the recovery of polar organic solvents which are solvents for the polyhalo aromatic compounds and the alkali metal sulfides used in the production of the arylene sulfide polymers. Examples of such polar organic solvents include amides, including lactams, and sulfones. Specific examples of such polar organic solvents include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N-dimethylacetamide, low molecular weight polyamides, and the like. The polar organic solvent presently preferred is N-methyl-2-pyrrolidone (NMP).

In a preferred embodiment, the polymerization reaction effluent comprising arylene sulfide polymer, alkali metal halide, polar organic solvent, and minor amounts of impurities is mixed with an amount of water sufficient to provide 0.01 to 100, preferably 1 to 20, parts by weight water per part by weight polar organic solvent. The arylene sulfide polymer is then separated by filtration, centrifugation or other mechanical means from the aqueous solution, containing polar organic solvent and alkali metal halide. A portion of the water, instead of being added directly to the polymerization reaction effluent as above, can be used first to wash arylene sulfide polymer previously separated from the bulk of the solution. Alternatively, the washings can be added to the aqueous solution containing polar organic solvent and alkali metal halide subsequent to removal of arylene sulfide polymer.

The aqueous solution is then extracted. The extractant suitable for use in this invention is selected from the group consisting of dichloromethane, chloroform, 1,2-dichloroethane, 1,1,2-trichloroethane, 1,1,2,2-tetrachloroethane, trichloroethylene, 1-hexanol, cyclohexanol, methyl isobutyl ketone, aniline, and mixtures thereof. The preferred extractants are dichloromethane, chloroform, 1,1,2,2-tetrachloroethane, cyclohexanol, and aniline. The extractants most preferred are dichloromethane, chloroform and 1,1,2,2-tetrachloroethane.

Suitability of the above extractants in the process of this invention is based on a number of characteristics of the extractants. These extractants have (1) a low solubility in water an in aqueous alkali metal halide solutions, (2) a large distribution coefficient for the polar organic solvent to be extracted so that large quantities of extractant are not required, (3) a relatively low cost, (4) a reasonable heat of vaporization to allow a saving in heat requirement over vaporization of the water present, (5) distillation characteristics to permit relatively easy separation from polar organic solvent, and (6) a density sufficiently different from that of the aqueous solution to permit good phase separation.

The weight ratio of extractant to aqueous solution generally is within the range of about 1:1 to 20:1, preferably about 1:1 to 7:1. Although the extraction can be carried out over a broad temperature range, the extraction temperature generally will be within the range of about 0°–200° C, preferably about 20°–100° C. Although elevated pressures, e.g., pressures up to about 20 atmospheres or more, can be employed, substantially atmospheric pressure is preferred. In any event, the pressure should be sufficient to maintain the components of the system substantially in the liquid phase. Although the extraction can be carried out batchwise, e.g., in a multiple extraction process, extraction in a continuous process is preferred.

Method for separating the polar organic solvent from the extractant can vary depending on the solvent and extractant used. The usual method of separation is distillation the techniques for which are so well known that discussion here is not necessary. As mentioned above one of the criteria for choosing a suitable extractant for this process is distillation characteristics to permit relatively easy separation of the polar organic solvent from the extractant.

The following specific examples are offered to show the effectiveness of the extractants chosen for accomplishing the extraction of the polar organic solvent from the aqueous mixture of the reaction effluent by the process of this invention. These examples are meant to be illustrative and not exclusive.

EXAMPLE I

A series of solutions of 25.0 g. of N-methyl-2-pyrrolidone (NMP) and 69.8 g. of 10.6 weight per cent sodium chloride in water was prepared. This composition was designed to simulate the filtrate obtained upon filtering arylene sulfide polymer from a mixture of water and reaction effluent from the reaction of a polyhalo-substituted aromatic compound with sodium sulfide in NMP. Each of the solutions was extracted at about 25° C with 25 g. of an extractant, and the weight per cent NMP in the extractant phase was determined by gas chromatographic analysis. The NMP content of the extractant phase obtained through use of each of the extractants is shown in Table I.

TABLE I

| Extractant | Weight Percent NMP in Extractant Phase |
|---|---|
| Dichloromethane | 25.5 |
| Chloroform | 23.6 |
| Aniline | 22.5 |
| Cyclohexanol | 22.4 |
| 1,1,2,2-Tetrachloroethane | 20.9 |
| 1-Hexanol | 15.7 |
| 1,1,2-Trichloroethane | 14.6 |
| 1,2-Dichloroethane | 13.7 |
| Trichloroethylene | 5.7 |
| Methyl isobutyl ketone | 2.4 |

Thus, each of the above extractants was effective in extracting NMP from an aqueous solution containing sodium chloride and NMP.

EXAMPLE II

A series of mixtures containing varying ratios of dichloromethane (DCM), N-methyl-2-pyrrolidone (NMP), and either water or water containing 5.7 weight per cent sodium chloride was prepared, and the mixtures were shaken and then allowed to separate into phases at about 25° C. The phases were separated, weighed, and analyzed by gas chromatography. Table II shows the composition of the series of mixtures as well as the weight and composition of the phases which were separated. Additionally, Table II shows the density of the DCM and water phases from each of four of the extractions.

TABLE II.—SYSTEM: DCM-NMP-WATER

| Extraction | Composition of mixture | | | | | | DCM phase, g. | Water phase, g. | DCM phase composition weight, percent | | | Water phase composition, weight percent | | |
|---|---|---|---|---|---|---|---|---|---|---|---|---|---|---|
| | Weight percent | | | Weight, g. | | | | | | | | | | |
| | DCM | NMP | H₂O | DCM | NMP | H₂O | | | DCM | NMP | H₂O | DCM | NMP | H₂O |
| 1 | 50 | 10 | 40 | 100 | 20 | 80 | 106.5 | 92.9 | 91.0 | 8.67 | 0.33 | 5.2 | 17.0 | 77.8 |
| 2 | 45 | 20 | 35 | 90 | 40 | 70 | 104.7 | 94.8 | 78.2 | 20.6 | 1.2 | 2.1 | 24.0 | 73.9 |
| 3 | 40 | 35 | 25 | 80 | 70 | 50 | 111.4 | 88.6 | 63.6 | 31.4 | 5.0 | 7.2 | 44.1 | 48.7 |
| 4 | 37.5 | 40 | 22.5 | 84.4 | 90 | 50.6 | 125.9 | 99.2 | 55.1 | 38.1 | 6.8 | 12.9 | 50.6 | 36.5 |
| SYSTEM: DCM-NMP-5.7 WEIGHT PERCENT SALT WATER* | | | | | | | | | | | | | | |
| 5 | 50 | 10 | 40 | 100 | 20 | 80 | 108.8 | 90.3 | 88.9 | 10.1 | 1.0 | 3.5 | 9.5 | 87.0 |
| 6 | 45 | 20 | 35 | 90 | 40 | 70 | 108.5 | 92.2 | 78.4 | 18.7 | 2.9 | 4.1 | 20.2 | 75.7 |
| 7 | 40 | 35 | 25 | 80 | 70 | 50 | 118.9 | 80.5 | 59.8 | 33.0 | 7.2 | 7.9 | 37.3 | 54.8 |
| 8 | 37.5 | 40 | 22.5 | 75 | 80 | 45 | 125.9 | 74.0 | 49.6 | 37.1 | 13.3 | 10.9 | 45.3 | 43.8 |

*In Extractions 5–8 values for weight of H₂O and weight percent H₂O include NaCl present.

Density of phases from extractions 5–8, g./cm.³

| Extraction | DCM phase | Water phase |
|---|---|---|
| 5 | 1.2824 | 1.0457 |
| 6 | 1.2504 | 1.0524 |
| 7 | 1.1991 | 1.0690 |
| 8 | 1.1760 | 1.0792 |

Thus, DCM effectively extracted NMP from aqueous solutions of NMP in the presence or absence of sodium chloride. The difference in density between the dichloromethane phase and the water phase, even when the water phase contained sodium chloride, was sufficiently different to permit good separation of the phases.

EXAMPLE III

A series of mixtures consisting of N-methyl-2-pyrrolidone (NMP) and water containing varying amounts of sodium chloride was extracted with dichloromethane (DCM) at about 25° C. The phases were separated and analyzed by gas chromatography. The sodium chloride concentration, when determined, was obtained by flame emission spectroscopy. Additionally, a multiple extraction of a mixture of 10.6 weight per cent aqueous sodium chloride and NMP was made using in each extraction a weight of DCM equal to the original weight of NMP. The first, fifty, and tenth extractant phases contained 25.7, 8.5, and 1.15 weight per cent NMP, and the corresponding water phases contained 21.4, 5.6, and 0.40 weight per cent NMP. The results of the extractions carried out in this Example are summarized in Table III. In the Table the values shown for weight per cent water in the separated phases includes any sodium chloride present.

EXAMPLE IV

Mixtures prepared from N-methyl-2-pyrrolidone (NMP), either chloroform or 1,1,2,2-tetrachloroethane as the extractant, and water containing 5.7 weight per cent sodium chloride were shaken and then allowed to separate into phases at about 25° C. The phases were separated and analyzed by gas chromatography. The data obtained are summarized in Table IV. In the Table the values shown for weight of water and weight per cent water include any sodium chloride present.

TABLE IV.—SYSTEM: CHLOROFORM-NMP-5.7 WEIGHT PERCENT SALT WATER

| Composition of mixture | | | | | | Extract phase composition weight percent | | | Water phase composition weight percent | | |
|---|---|---|---|---|---|---|---|---|---|---|---|
| Weight percent | | | Weight, g. | | | | | | | | |
| Extractant | NMP | H₂O | Extractant | NMP | H₂O | Extractant | NMP | H₂O | Extractant | NMP | H₂O |
| 45 | 20 | 35 | 90 | 40 | 70 | 78.9 | 20.1 | 1.0 | 1.5 | 20.5 | 78.0 |
| 37.5 | 40 | 22.5 | 75 | 80 | 45 | 61.2 | 35.6 | 3.2 | 5.9 | 43.1 | 51.0 |

SYSTEM: 1,1,2,2-TETRACHLOROETHANE-NMP-5.7 WEIGHT PERCENT SALT WATER

| Extractant | NMP | H₂O | Extractant | NMP | H₂O | Extractant | NMP | H₂O | Extractant | NMP | H₂O |
|---|---|---|---|---|---|---|---|---|---|---|---|
| 45 | 20 | 35 | 90 | 40 | 70 | 79.9 | 18.8 | 1.3 | 0.74 | 23.9 | 75.4 |
| 37.5 | 40 | 22.5 | 75 | 80 | 45 | 60.2 | 35.6 | 4.2 | 5.9 | 45.2 | 48.9 |

Thus, chloroform and 1,1,2,2-tetrachlorethane were effective in extracting NMP from aqueous sodium chloride solutions of NMP.

Reasonable variation and modification are possible within the scope of the foregoing disclosure and the appended claims of the invention the essence of which is that there has been provided a method for recovering a polar organic solvent from an aqueous solution by extraction with specified chemical compounds.

We claim:

1. A method for recovering N-methyl-2-pyrrolidone from an aqueous reaction mixture solids slurry obtained by reacting a polyhalo-substituted aromatic compound and an alkali metal sulfide in N-methyl-2-pyrrolidone with subsequent slurrying by water dilu-

TABLE III

| Composition of mixture, g. | | | DCM, g. | Phase composition, weight percent | | | | | | NaCl in DCM phase, p.p.m. | NaCl in water phase, ppm |
|---|---|---|---|---|---|---|---|---|---|---|---|
| | | | | DCM phase | | | Water phase | | | | |
| Water | NaCl | NMP | | DCM | NMP | H₂O | DCM | NMP | H₂O | | |
| 69.8 | 0 | 25.0 | 94.8 | 87.2 | 11.8 | 1.0 | 7.4 | 13.7 | 78.9 | | |
| 39.98 | 2.02 | 8.0 | 50.0 | 90.3 | 8.7 | 1.0 | 6.3 | 7.6 | 86.1 | | |
| 62.4 | 7.4 | 25.0 | 94.8 | 85.2 | 13.7 | 0.9 | 7.8 | 12.8 | 79.4 | | |
| 79.5 | 4.80 | 15.0 | 106.5 | 92.3 | 7.2 | 0.5 | 3.4 | 6.8 | 89.8 | 3 | 51.400 |
| 45.0 | 0.090 | 42.5 | 300 | 89.0 | 10.1 | 0.9 | 4.0 | 13.4 | 82.6 | 1 | 1,798 |
| 45.0 | 0.045 | 42.5 | 300 | 88.0 | 10.2 | 1.0 | 4.7 | 13.5 | 81.8 | 1 | 874 |
| 45.0 | 0.0025 | 42.5 | 300 | 87.5 | 11.5 | 1.0 | 4.0 | 14.0 | 82.0 | <1 | 450 |
| 45.0 | 0.0045 | 42.5 | 300 | 87.3 | 11.7 | 1.0 | 4.6 | 14.8 | 81.6 | <1 | 97 |
| MULTIPLE EXTRACTION | | | | | | | | | | | |
| 62.4 | 7.4 | 25.0 | 25.0 | 73.4 | 25.7 | 0.9 | 3.5 | 21.4 | 75.1 | | |
| From 4th extraction | | | 25.0 | 91.1 | 8.5 | 0.4 | 2.0 | 5.6 | 92.4 | | |
| From 9th extraction | | | 25.0 | 98.65 | 1.15 | 0.2 | 2.0 | 0.40 | 97.6 | | |

Thus, DCM was effective in extracting NMP from solutions of NMP in water containing sodium chloride over a wide range of concentrations. Quite important for the success of commercial operation was the finding that the amount of sodium chloride in the DCM phase was extremely small. The results of the multiple extraction gave further support for the applicability of DCM as an extractant for recovering NMP from an aqueous solution containing NMP.

tion, which method comprises:
a. separating the reaction mixture solids from the aqueous solution;
b. extracting the N-methyl-2-pyrrolidone from said aqueous solution with an extractant selected from the group consisting of dichloromethane, chloroform, 1,2-dichloroethane, 1,1,2-trichloroethane, 1,1,2,2-tetrachloroethane, trichloroethylene, 1-hexanol, cyclohexanol, methyl isobutyl ketone, aniline, and mixtures thereof; and c. separating the extracted N-methyl-2-pyrrolidone from the extractant.

2. The method of claim 1 wherein the method of separating the polar organic solvent and the extractant is by distillation.

3. The method of claim 1 wherein extracting the N-methyl-2-pyrrolidone from an aqueous solution which comprises an amount of water sufficient to provide 0.01 to 100 parts by weight water per part by weight polar organic diluent is accomplished at a ratio of 1:1 to 20:1 weight ratio of extractant to aqueous solution within a temperature range of about 0° C to about 200° C.

4. The method of claim 1 wherein the method of separating the solid and liquid components of the aqueous reaction mixture is chosen from filtration and centrifugation.

5. The method of claim 1 wherein the extractant is selected from the group consisting of dichloromethane, chloroform, and 1,1,2,2-tetrachloroethane.

* * * * *